United States Patent
Beckley et al.

(10) Patent No.: US 9,881,616 B2
(45) Date of Patent: Jan. 30, 2018

(54) METHOD AND SYSTEMS HAVING IMPROVED SPEECH RECOGNITION

(75) Inventors: Jeffrey D. Beckley, Brush Prairie, WA (US); Pooja Aggarwal, San Ramon, CA (US); Shivakumar Balasubramanyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 13/490,161

(22) Filed: Jun. 6, 2012

(65) Prior Publication Data
US 2013/0332165 A1    Dec. 12, 2013

(51) Int. Cl.
| | |
|---|---|
| *G10L 15/00* | (2013.01) |
| *G10L 17/00* | (2013.01) |
| *G10L 17/04* | (2013.01) |
| *G10L 15/20* | (2006.01) |
| *G10L 21/0216* | (2013.01) |

(52) U.S. Cl.
CPC .............. *G10L 17/04* (2013.01); *G10L 15/20* (2013.01); *G10L 17/00* (2013.01); *G10L 2021/02166* (2013.01)

(58) Field of Classification Search
CPC ....... G10L 17/06; G10L 17/02; G10L 15/265; G10L 17/04
USPC ........................................................ 704/246
See application file for complete search history.

(56) References Cited

U.S. PATENT DOCUMENTS

| | | | | | |
|---|---|---|---|---|---|
| 4,748,670 | A | * | 5/1988 | Bahl | G10L 15/14 704/256.1 |
| 5,353,376 | A | * | 10/1994 | Oh | G10L 15/20 379/88.01 |
| 5,832,430 | A | * | 11/1998 | Lleida | G10L 15/142 704/231 |
| 6,005,610 | A | * | 12/1999 | Pingali | G01S 3/808 348/14.16 |
| 6,173,059 | B1 | * | 1/2001 | Huang | H04R 1/406 379/202.01 |

(Continued)

FOREIGN PATENT DOCUMENTS

| | | |
|---|---|---|
| DE | 102009051508 A1 | 5/2011 |
| EP | 2028061 A2 | 2/2009 |
| WO | WO-03107327 A1 | 12/2003 |

OTHER PUBLICATIONS

E. Lleida, J. Fernandez, E. Masgrau, Robust continuous speech recognition system based on a microphone array, Acoustics, Speech, and Signal Processing, 1998. ICASSP '98. Proceedings of the 1998 IEEE International Conference on, vol. 1, May 12-15, 1998.*

(Continued)

*Primary Examiner* — Fariba Sirjani
(74) *Attorney, Agent, or Firm* — Kilpatrick Townsend & Stockton

(57) ABSTRACT

A method for improving speech recognition by a speech recognition system includes obtaining a voice sample from a speaker; storing the voice sample of the speaker as a voice model in a voice model database; identifying an area from which sound matching the voice model for the speaker is coming; providing one or more audio signals corresponding to sound received from the identified area to the speech recognition system for processing.

34 Claims, 8 Drawing Sheets

(56) References Cited

U.S. PATENT DOCUMENTS

| | | | |
|---|---|---|---|
| 6,219,645 B1 | 4/2001 | Byers | |
| 6,700,980 B1* | 3/2004 | Hamalainen et al. | 381/17 |
| 6,847,892 B2* | 1/2005 | Zhou | G01S 5/0027 340/426.1 |
| 6,853,716 B1* | 2/2005 | Shaffer | H04M 3/56 370/260 |
| 6,961,703 B1* | 11/2005 | Higgins | G06K 9/6235 704/243 |
| 7,016,833 B2* | 3/2006 | Gable et al. | 704/209 |
| 7,383,178 B2* | 6/2008 | Visser | G10L 21/0272 704/227 |
| 7,406,415 B1* | 7/2008 | Cardillo et al. | 704/236 |
| 7,415,117 B2* | 8/2008 | Tashev et al. | 381/92 |
| 7,454,334 B2* | 11/2008 | Agranat | 704/231 |
| 7,680,287 B2* | 3/2010 | Amada et al. | 381/92 |
| 7,739,114 B1* | 6/2010 | Chen | G10L 21/0272 704/270 |
| 7,957,542 B2* | 6/2011 | Sarrukh | G10K 11/341 367/118 |
| 8,085,948 B2* | 12/2011 | Thomas | G10K 11/16 318/400.23 |
| 8,131,544 B2* | 3/2012 | Herbig | G10L 25/78 704/206 |
| 8,233,352 B2* | 7/2012 | Beaucoup | G01S 3/8083 367/119 |
| 8,270,632 B2* | 9/2012 | Hwang | H04R 3/005 367/118 |
| 8,725,508 B2* | 5/2014 | Ben-Ezra | 704/254 |
| 8,731,919 B2* | 5/2014 | George | G10L 15/19 704/235 |
| 8,731,936 B2* | 5/2014 | Brush et al. | 704/270 |
| 8,775,187 B2* | 7/2014 | Summerfield et al. | 704/273 |
| 8,811,638 B2* | 8/2014 | Lord et al. | 381/312 |
| 8,886,663 B2* | 11/2014 | Gainsboro et al. | 707/769 |
| 8,913,103 B1* | 12/2014 | Sargin | G06K 9/00221 348/14.12 |
| 8,942,979 B2* | 1/2015 | Kim | G10L 15/065 704/245 |
| 8,981,994 B2* | 3/2015 | Sorenson | G10K 11/34 342/368 |
| 9,269,367 B2* | 2/2016 | Strommer | G10L 21/02 |
| 2002/0101505 A1* | 8/2002 | Gutta | H04N 7/15 348/14.07 |
| 2002/0135618 A1* | 9/2002 | Maes | G06F 3/0481 715/767 |
| 2003/0033150 A1* | 2/2003 | Balan | G10L 15/22 704/275 |
| 2003/0135372 A1* | 7/2003 | Zinser, Jr. | G10L 19/00 704/258 |
| 2004/0024582 A1* | 2/2004 | Shepard | G10L 25/78 704/2 |
| 2004/0064314 A1* | 4/2004 | Aubert | G10L 25/87 704/233 |
| 2004/0107100 A1* | 6/2004 | Lu | G10L 17/00 704/238 |
| 2004/0220769 A1* | 11/2004 | Rui | G06T 7/277 702/179 |
| 2005/0058278 A1* | 3/2005 | Gallego Hugas | G10L 21/0208 379/406.01 |
| 2005/0060142 A1* | 3/2005 | Visser | G10L 21/0208 704/201 |
| 2005/0141731 A1* | 6/2005 | Hamalainen | H01Q 3/2605 381/94.3 |
| 2005/0192768 A1* | 9/2005 | Tashev | G01S 7/00 702/94 |
| 2005/0195988 A1* | 9/2005 | Tashev et al. | 381/92 |
| 2005/0243167 A1* | 11/2005 | Clarke | H04N 7/148 348/14.12 |
| 2005/0243168 A1* | 11/2005 | Cutler | H04N 7/147 348/14.12 |
| 2006/0005136 A1* | 1/2006 | Wallick | H04M 9/082 715/726 |
| 2006/0053002 A1* | 3/2006 | Visser | G10L 21/0272 704/200 |
| 2006/0074686 A1* | 4/2006 | Vignoli | G10L 15/26 704/275 |
| 2006/0075422 A1* | 4/2006 | Choi | G01S 3/7864 725/18 |
| 2006/0085189 A1* | 4/2006 | Dalrymple et al. | 704/250 |
| 2006/0104454 A1 | 5/2006 | Guitarte Perez et al. | |
| 2006/0122832 A1* | 6/2006 | Takiguchi | G10L 21/0208 704/240 |
| 2006/0212291 A1* | 9/2006 | Matsuo | G10L 21/028 704/231 |
| 2006/0245601 A1* | 11/2006 | Michaud | G01S 5/22 381/92 |
| 2007/0082706 A1* | 4/2007 | Campbell et al. | 455/563 |
| 2007/0106724 A1* | 5/2007 | Gorti | G06Q 10/10 709/204 |
| 2007/0120979 A1* | 5/2007 | Zhang | G08B 13/19667 348/154 |
| 2007/0273585 A1* | 11/2007 | Sarroukh | G10K 11/341 342/379 |
| 2008/0019548 A1 | 1/2008 | Avendano | |
| 2008/0140421 A1* | 6/2008 | Marturano | G10L 17/00 704/275 |
| 2008/0253589 A1 | 10/2008 | Trahms | |
| 2009/0018828 A1* | 1/2009 | Nakadai | G10L 15/20 704/234 |
| 2009/0055178 A1* | 2/2009 | Coon | 704/246 |
| 2009/0119103 A1* | 5/2009 | Gerl | G10L 17/04 704/243 |
| 2009/0150149 A1* | 6/2009 | Culter | G06K 9/6293 704/246 |
| 2009/0164212 A1 | 6/2009 | Chan | |
| 2010/0017205 A1* | 1/2010 | Visser et al. | 704/225 |
| 2010/0195838 A1 | 8/2010 | Bright | |
| 2010/0198598 A1* | 8/2010 | Herbig | G10L 17/06 704/240 |
| 2010/0217590 A1* | 8/2010 | Nemer et al. | 704/233 |
| 2010/0223056 A1* | 9/2010 | Kadirkamanathan | G10L 15/02 704/235 |
| 2011/0145000 A1* | 6/2011 | Hoepken | G10L 15/22 704/275 |
| 2011/0264454 A1* | 10/2011 | Ullberg et al. | 704/500 |
| 2011/0285807 A1* | 11/2011 | Feng | G06K 9/00228 348/14.08 |
| 2011/0285809 A1* | 11/2011 | Feng | G06K 9/00234 348/14.16 |
| 2011/0295603 A1* | 12/2011 | Meisel | G10L 15/07 704/246 |
| 2011/0301953 A1* | 12/2011 | Lee | G10L 15/187 704/243 |
| 2011/0306304 A1* | 12/2011 | Forutanpour | G06F 3/04883 455/67.11 |
| 2011/0307251 A1* | 12/2011 | Tashev | G10L 21/028 704/231 |
| 2012/0027218 A1* | 2/2012 | Every | G10L 21/0208 381/66 |
| 2012/0078624 A1* | 3/2012 | Yook | G10L 25/78 704/233 |
| 2012/0120218 A1* | 5/2012 | Flaks | G10L 21/028 348/77 |
| 2012/0249328 A1* | 10/2012 | Xiong | G10L 15/22 340/541 |
| 2012/0300080 A1* | 11/2012 | Batson | H04N 21/23412 348/159 |
| 2013/0006626 A1* | 1/2013 | Aiyer et al. | 704/235 |
| 2013/0024196 A1* | 1/2013 | Ganong, III | G10L 17/00 704/246 |
| 2013/0041665 A1* | 2/2013 | Jang | H04N 21/42203 704/246 |
| 2013/0060571 A1* | 3/2013 | Soemo | G10L 15/30 704/251 |
| 2013/0102324 A1* | 4/2013 | Qiu | H04W 4/023 455/456.1 |

(56) References Cited

U.S. PATENT DOCUMENTS

| | | | | |
|---|---|---|---|---|
| 2013/0300939 A1* | 11/2013 | Chou | ................ | G06K 9/00765 |
| | | | | 348/700 |
| 2014/0214424 A1* | 7/2014 | Wang | ................ | G06K 9/00288 |
| | | | | 704/246 |
| 2014/0247926 A1* | 9/2014 | Gainsboro | .......... | H04M 3/2281 |
| | | | | 379/88.01 |

OTHER PUBLICATIONS

D.A. Reynolds, R.C. Rose, "Robust Text-Independent Speaker Identification Using Mixture Speaker Models", IEEE Trans. On Speech and Audio Processing, pp. 72-83, vol. 3. Jan. 1995.*

International Search Report and Written Opinion—PCT/US2013/044338—ISA/EPO—Nov. 7, 2013

Lleida E., et al., "Robust Continuous Speech Recognition System Based on a Microphone Array", Acoustics, Speech and Signal Processing, 1998. Proceedings of the 1998 IEEE International Conference on Seattle, WA, USA May 12-15, 1998, New York, NY, USA,IEEE, US, vol. 1, May 12, 1998 (May 12, 1998), pp. 241-244, XP010279154, DOI: 10.1109/ICASSP.1998.674412, ISBN: 978-0-7803-4428-0.

Campbell J. P. Jr., "Speaker recognition: A tutorial", Proceedings of the IEEE vol. 85, No. 9, Sep. 1997, pp. 1437-1462.

* cited by examiner

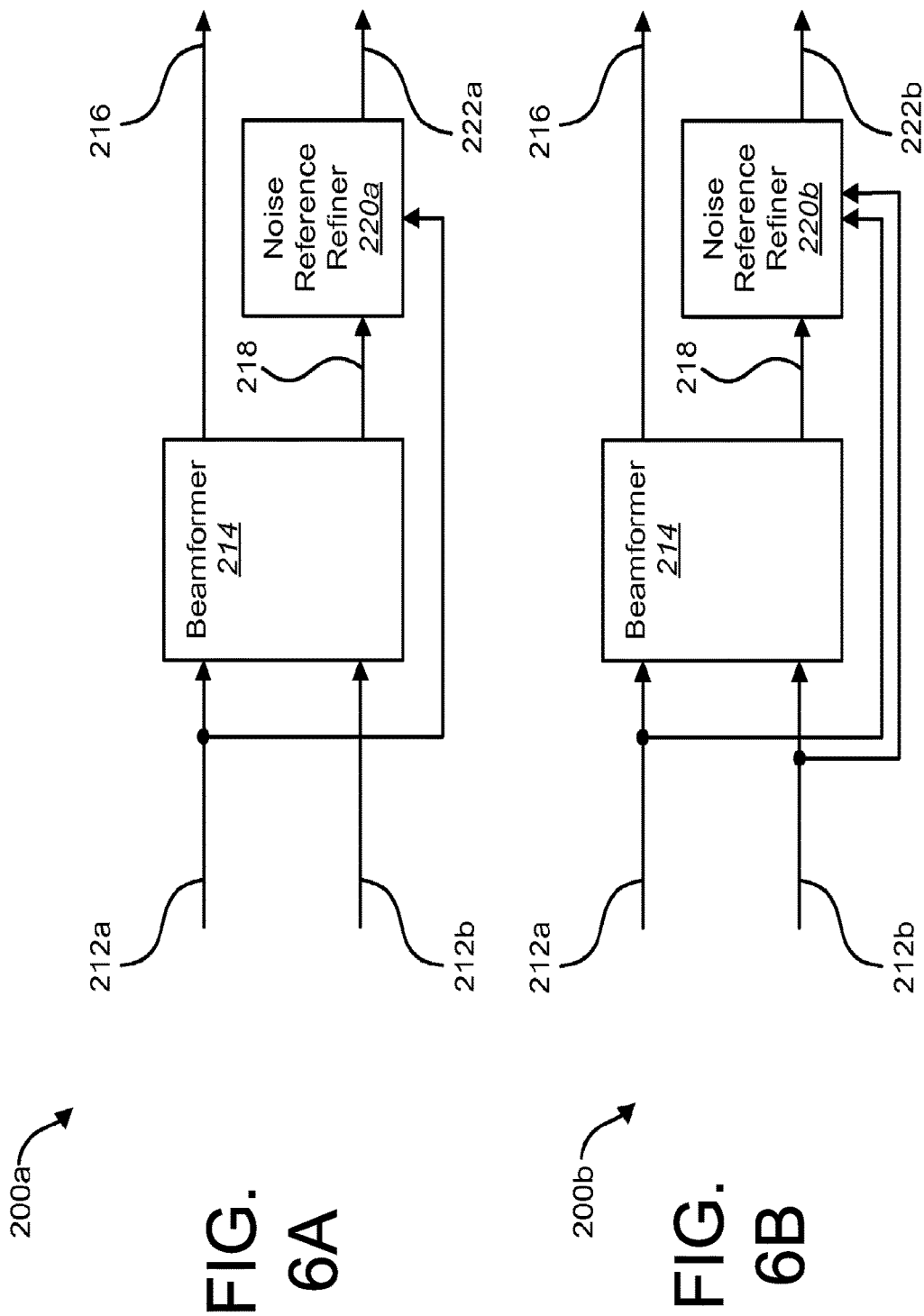

METHOD AND SYSTEMS HAVING IMPROVED SPEECH RECOGNITION

BACKGROUND

1. Field

The disclosure relates generally to the field of speech recognition systems and methods, and, in particular, to speech recognition systems and methods having improved speech recognition.

2. Background

Speech recognition (SR) (also commonly referred to as voice recognition) represents one of the most important techniques to endow a machine with simulated intelligence to recognize user or user-voiced commands and to facilitate human interface with the machine. SR also represents a key technique for human speech understanding. Systems that employ techniques to recover a linguistic message from an acoustic speech signal are called voice recognizers. The term "speech recognizer" is used herein to mean generally any spoken-user-interface-enabled device or system.

The use of SR is becoming increasingly important for safety reasons. For example, SR may be used to replace the manual task of pushing buttons on a wireless telephone keypad. This is especially important when a user is initiating a telephone call while driving a car. When using a phone without SR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. In addition, a hands-free car-kit system would permit the driver to maintain both hands on the steering wheel during call initiation.

Speech recognition (ASR) systems, such as always-on speech recognition (ASR) systems, have difficulty handling ambient noise, such as background conversation or other undesired noise. The presence of background conversation, for instance, may cause the system to recognize a command that was not intended by the user of the system, thus leading to a number of false positives and misrecognitions. For example, in a car environment, while the driver might be the issuer of voice commands to control the ASR system, the presence of passengers and ensuing conversation between them can greatly reduce the performance of the ASR system as their conversations may lead to commands that are false positives or misrecognitions.

SUMMARY

A method for improving speech recognition by a speech recognition system includes, but is not limited to any one or combination of: (i) obtaining a voice sample from a speaker; (ii) storing the voice sample of the speaker as a voice model in a voice model database; (iii) identifying an area from which sound matching the voice model for the speaker is coming; and (iv) providing one or more audio signals corresponding to sound received from the identified area to the speech recognition system for processing.

In various embodiments, the method further includes controlling microphones to receive sound from the identified area.

In some embodiments, the method further includes controlling the microphones to not receive sound from areas other than the identified area.

In various embodiments, the method further includes filtering sound received from areas other than the identified area.

In various embodiments, the method further includes separating ambient noise from speech in the one or more audio signals; and providing the resulting speech signal to the speech recognition system for processing.

In various embodiments, the identifying includes receiving, from one or more microphones, one or more audio signals corresponding to sound coming from a first area of a plurality of areas; and determining whether the received audio signals corresponding to the sound coming from the first area match the voice model for the speaker. The providing includes selectively providing audio signals corresponding to sound from the first area to the speech recognition system for processing thereof based on the determination.

In some embodiments, if the one or more received audio signals corresponding to the sound coming from the first area match the voice model for the speaker, one or more audio signals corresponding to sound from the first area are provided to the speech recognition system for processing thereof. If the one or more received audio signals corresponding to the sound coming from the first area do not match the voice model for the speaker, one or more audio signals corresponding to sound from the first area are not provided to the speech recognition system for processing thereof.

In some embodiments, one or more audio signals corresponding to sound from the first area received after the determination are selectively provided to the speech recognition system for processing thereof based on the determination.

In some embodiments, the one or more microphones comprise at least two microphones.

In some embodiments, the method further includes: receiving, from the one or more microphones, one or more audio signals corresponding to sound coming from a second area of the plurality of areas; determining whether the one or more received audio signals corresponding to the sound coming from the second area match the voice model for the speaker; and selectively providing audio signals corresponding to sound from the second area to the speech recognition system for processing thereof based on the determination.

In further embodiments, if the one or more audio signals corresponding to the sound coming from the second area match the voice model for the speaker, one or more audio signals corresponding to sound from the second area are provided to the speech recognition system for processing thereof. If the one or more audio signals corresponding to the sound coming from the second area do not match the voice model for the speaker, one or more audio signals corresponding to sound from the second area are not provided to the speech recognition system for processing thereof.

In some embodiments, the determining includes: characterizing the sound coming from the first area; and comparing the characterized sound to the voice model for the speaker.

In further embodiments, if the characterized sound compares with the voice model for the speaker, the sound coming from the first area is determined to be speech from the speaker and one or more audio signals corresponding to sound coming from the first area is provided to the speech recognition system. If the characterized sound does not compare with the voice model for the speaker, the sound coming from the first area is determined not to be speech from the speaker and one or more audio signals corresponding to sound coming from the first area is not provided to the speech recognition system.

In further embodiments, the sound coming from the first area is characterized through analysis of an acoustic spectrum of the sound.

In further embodiments, the one or more microphones comprises a first microphone associated with a first area of the plurality of areas and a second microphone associated a second area of the plurality of areas. If the one or more received audio signals corresponding to the sound coming from the first area matches the voice model for the speaker, one or more audio signals corresponding to sound from the first area are received from the first microphone for providing to the speech recognition system. If the one or more received audio signals corresponding to the sound coming from the first area do not matches the voice model for the speaker, one or more audio signals corresponding to sound from the first area are not received from the first microphone for providing to the speech recognition system.

In yet further embodiments, if the one or more received audio signals corresponding to the sound coming from the first area matches the voice model for the speaker and the one or more received audio signals corresponding to the sound coming from the second area does not match the voice model for the speaker, one or more audio signals corresponding to sound from the first area are received from the first microphone for providing to the speech recognition system. If the one or more received audio signals corresponding to the sound coming from the first area does not match the voice model for the speaker and the one or more received audio signals corresponding to the sound coming from the second area matches the voice model for the speaker, one or more audio signals corresponding to sound from the second area are received from the second microphone.

In various embodiments, the audio signals provided to the speech recognition system correspond to speech commands for the speech recognition system. The speech recognition system issues instructions based on the speech.

An apparatus for improving speech recognition by a speech recognition system, includes, but is not limited to any one or combination of: means for obtaining a voice sample from a speaker; means for storing the voice sample of the speaker as a voice model in a voice model database; means for identifying an area from which sound matching the voice model for the speaker is coming; and means for providing one or more audio signals corresponding to sound received from the identified area to the speech recognition system for processing.

An apparatus for improving speech recognition by a speech recognition system includes a processor configured for (but is not limited to any one or combination of): obtaining a voice sample from a speaker; storing the voice sample of the speaker as a voice model in a voice model database; receiving, from one or more microphones, one or more audio signals corresponding to sound coming from a first area of a plurality of areas; identifying an area from which sound matching the voice model for the speaker is coming; and providing one or more audio signals corresponding to sound received from the identified area to the speech recognition system for processing.

A computer program product for improving speech recognition by a speech recognition system includes a computer-readable storage medium comprising code for (but is not limited to any one or combination of): obtaining a voice sample from a speaker; storing the voice sample of the speaker as a voice model in a voice model database; receiving, from one or more microphones, one or more audio signals corresponding to sound coming from a first area of a plurality of areas; identifying an area from which sound matching the voice model for the speaker is coming; and providing one or more audio signals corresponding to sound received from the identified area to the speech recognition system for processing.

BRIEF DESCRIPTION OF THE DRAWINGS

FIG. 6A is a block diagram of a directional sound capturing system according to various embodiments of the disclosure.

FIG. 6B is a block diagram of a directional sound capturing system according to various embodiments of the disclosure.

DETAILED DESCRIPTION

Various embodiments relate to a system for improving quality of speech recognition performed by a speech recognition system. Particular embodiments relate to a speech recognition quality improvement (SRQI) system implementing voice biometrics to authenticate speakers and directional sound capturing for discriminating (e.g., via directional filtering and/or directional tracking by microphones) speech from the authenticated speaker against undesired sound (e.g., ambient noise, background conversations, etc.) such that the speech is provided to and/or processed by the speech recognition system while reducing undesired sound being provided to and/or processed by the speech recognition system.

For instance, in some embodiments, the SRQI system may include a voice biometrics system for performing speaker identification by providing a voice sample to enroll a speaker (user) as a valid speaker for issuing commands to the speech recognition system and then identifying speech matching the voice sample as coming from the valid speaker. In further embodiments, the SRQI system also includes a directional sound capturing system (e.g., via directional filtering and/or directional tracking by microphones) for capturing sound, based on the voice sample of the valid speaker, from an area in which the valid speaker is located and providing the sound in the valid speaker's area to the speech recognition system and rejecting sound coming from other areas so that such sound is not provided to or otherwise processed by the speech recognition system.

For example, in the context of a vehicle (or home, building, outside, or any other environment), according to various embodiments, a voice biometrics system allows for enrolling a driver of a car by providing a voice sample and then identifying the driver of the car as the valid speaker for issuing commands to the speech recognition system. By identifying the driver via voice biometrics, a directional sound capturing system may selectively provide sound (e.g., speech commands) from a direction or area of the driver to the speech recognition system for processing corresponding commands and prevent or mitigate undesired sound, such as speech or other sound from an occupant or music, from being provided to or otherwise processed by the speech recognition system. Accordingly, by implementing such a SRQI system to reduce at least some of the undesired sound being provided to the speech recognition system, the speech recognition system will be less likely to perform a task based on sound that was not intended by the speaker, thus leading to fewer false positives and misrecognitions by the speech recognition system.

Figure 1:
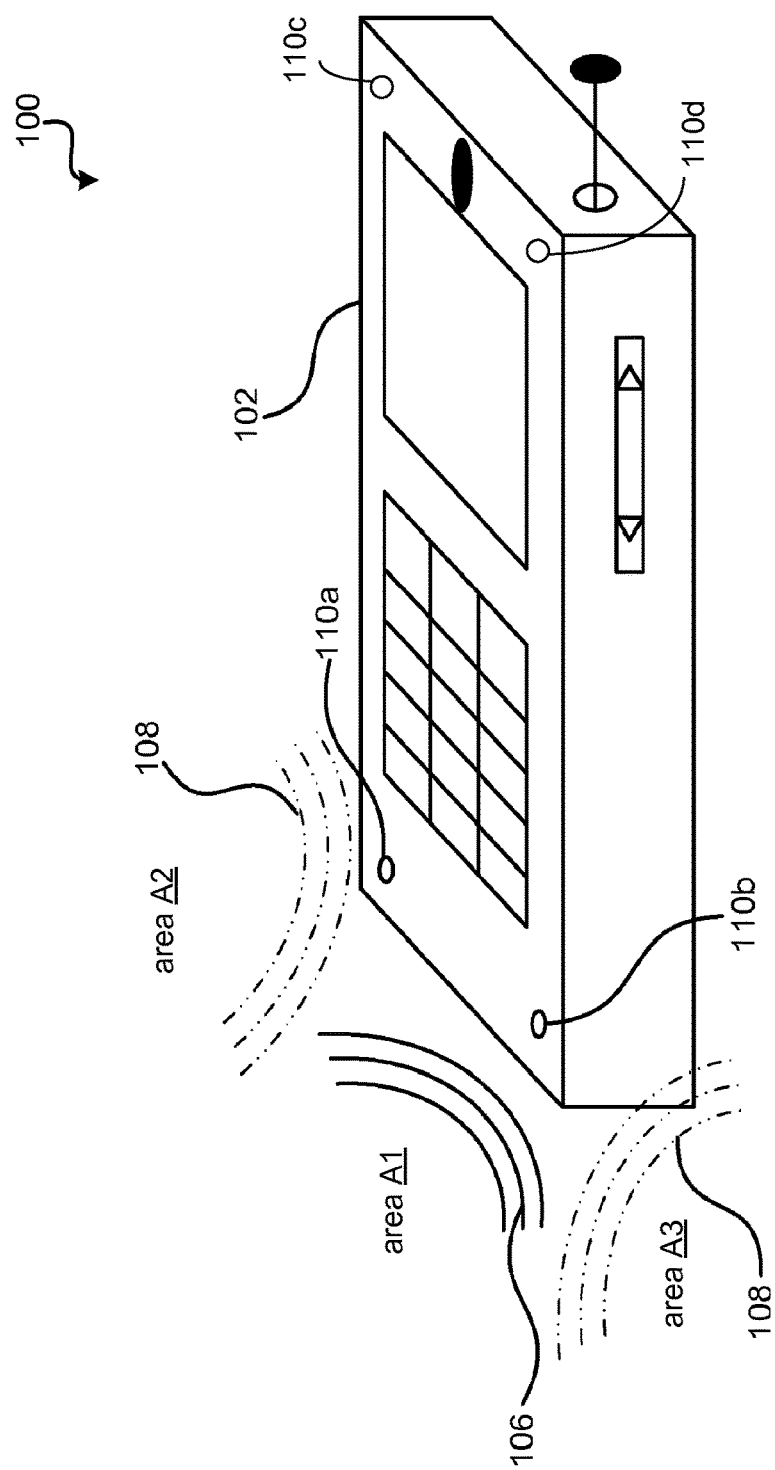
FIG. 1 is an illustration of an electronics device according to various embodiments of the disclosure.
Figure 2:
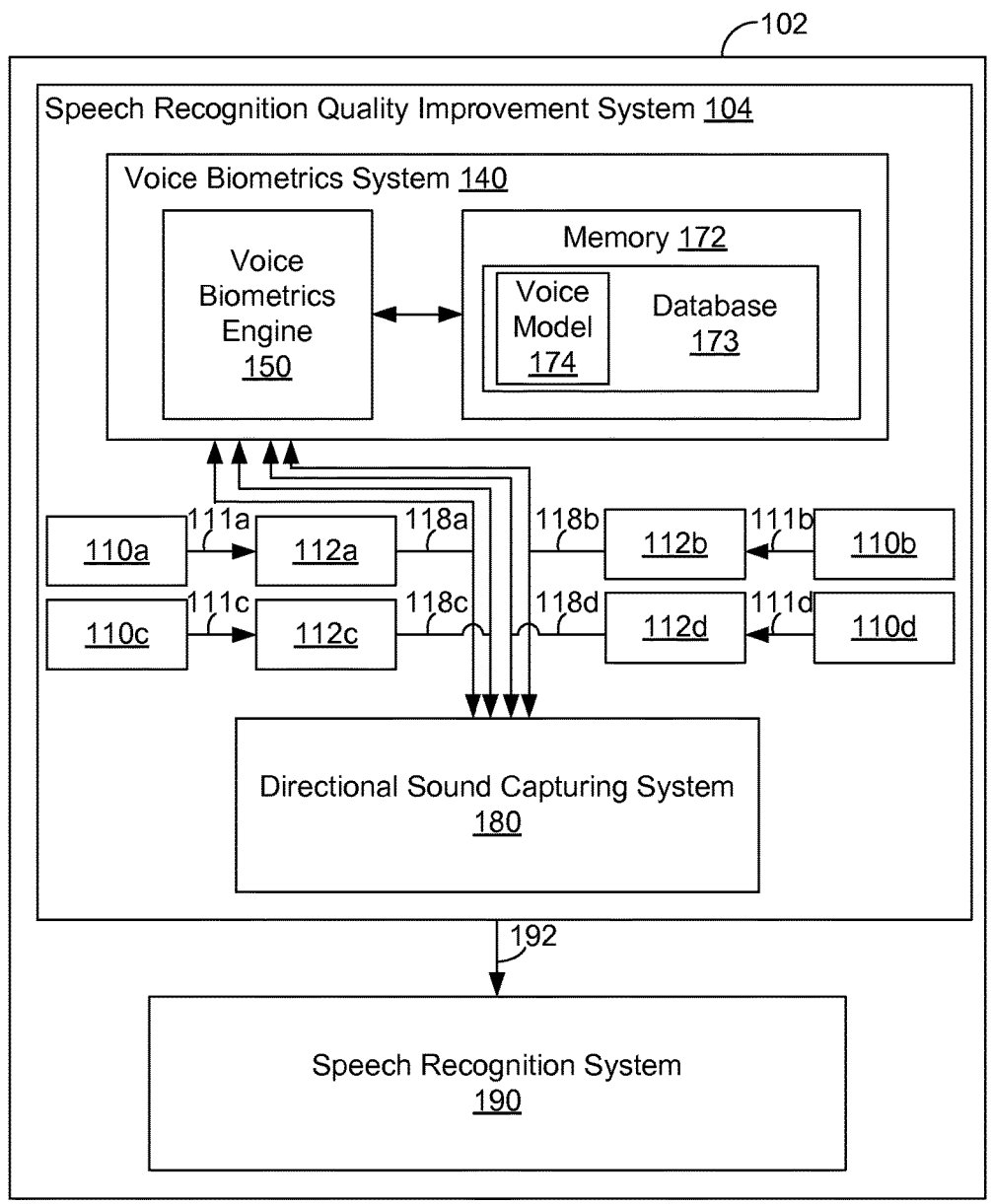
FIG. 2 is a block diagram of various components in an electronics device according to various embodiments of the disclosure.

FIGS. 1 and 2 illustrate an electronics device 102 having a speech recognition system 190 and a speech recognition quality improvement (SRQI) system 104 for improving quality of audio or speech input provided to the speech recognition system 190 for processing thereof. The electronics device 102 may be, but is not limited to, a mobile phone, "land line" phone, wired headset, wireless headset (e.g. Bluetooth®), hearing aid, audio/video recording device, head unit (e.g., in a vehicle), or other electronic device that utilizes transducers/microphones for receiving audio.

The speech recognition system 190 may be any system that accepts speech (also referred to as voice) input in order to control certain functions, or may otherwise benefit from separation of desired noises from background noises, such as (but not limited to) communication devices. The speech recognition system 190 may include human-machine interfaces in electronic or computational devices that incorporate capabilities such as voice recognition and detection, speech enhancement and separation, voice-activated control, and the like. For instance, the speech recognition 190 system may be for performing functions based on speech (e.g., verbal commands) 106 received from a user (speaker) of the electronics device 102 for instance via microphones 110a, 110b, 110c, 110d. In particular embodiments, the speech recognition system 190 is an always-on speech recognition (ASR) system. It should be noted that the terms "user" and "speaker" may be used interchangeable unless otherwise noted. It should also be noted that the terms "speech" and "voice" may be used interchangeably unless otherwise noted. It should also be noted that the terms "sound" and "audio" may be used interchangeably unless otherwise noted.

In some embodiments, the microphones 110a-110d (which may be referred to collectively as microphones 110) are housed in the electronics device 102. In other embodiments, the microphones 110 are external (e.g., separate from) the electronics device 102. Each of the microphones 110 may have any suitable response, such as (but not limited to) omnidirectional, bidirectional, unidirectional (e.g., cardioid), and/or the like. The various types of microphones that may be used include, but are not limited to, piezoelectric microphones, dynamic microphones, electret microphones, and/or the like. In other embodiments, any suitable electroacoustic transducer may be used in place of or in addition to the microphones 110. In some embodiments, four microphones 110 are implemented. In other embodiments, any suitable number of microphones 110 (e.g., less than four or more than four) may be implemented. The microphones 110 may be referred to as an array of microphones. In various embodiments, the SRQI system 104 may include and/or control operation of the microphones 110.

In various embodiments, the SRQI system 104 includes a voice biometrics system 140, which may include a voice biometrics engine 150, for authenticating a speaker (or user) for issuing commands or the like based on speech from the speaker to the speech recognition system 190. The authentication of a speaker may be based on a voice sample of the speaker.

In some embodiments, the voice biometrics system 140 (or components thereof such as the voice biometrics engine 150, the database 173, and/or the like) may be provided on a host device, such as a remote server or other electronic device. The electronics device 102 may be connectable to the host device via a network. The network may be a local area network (LAN), a wide area network (WAN), a telephone network such as the Public Switched Telephone Network (PSTN), an intranet, the Internet, or a combination of networks. In other embodiments, the electronics device 102 may be connectable directly to the host device (e.g., USB, IR, Bluetooth, etc.).

The voice biometrics system 140 (e.g., via the voice biometrics engine 150) may be configured to provide an application service of authentication that includes, for example, enrollment and/or identification for enrolling a speaker and/or identifying the speaker based on speech from the speaker. Embodiments are provided wherein the speaker is a human being engaged in producing sounds in the form of utterances, which are recognized as speech, such as, for example, oral communication. According to various embodiments, the SRQI system 104 may implement voice biometrics to authenticate speakers and, once authenticated, may be a basis for discriminating desired sound (e.g., speech from the authenticated speaker) against undesired sound such that the desired sound is provided to and/or processed by the speech recognition system 190 while reducing undesired sound being fed to and/or processed by the speech recognition system 190.

In various embodiments, authentication includes an enrollment process and an identification process. The enrollment process may be performed to captures nuances (e.g., tones, patterns, accents, inflections, etc.) of a voice (speech) of a user enrolling in the system. A voice sample representing the nuances may be stored as a voice model 174 in a database 173 of voice models provided on a memory 172. In some embodiments, the voice model 174 (also referred to as a known acoustic model) may be a frequency distribution generated from training data (e.g., voice sample) obtained during the enrollment process. The voice model 174 obtained during the enrollment process may be used in authenticating (e.g., identifying) the user.

The identification process is the process of finding and attaching a speaker identity (e.g., as provided during the enrollment process) to a voice of an unknown speaker. In some embodiments, the voice biometrics system 140 compares captured sound (e.g., that includes speech 106 from an unknown speaker) with the voice models (voice prints) 174 stored on the database 173 of voice models. For instance, the voice biometrics system 140 may characterize the captured sound (e.g., through analysis of an acoustic spectrum of the sound) and compare the characterized sound to a known acoustic model (e.g., the voice model 174). In some embodiments, a time domain signal of the captured sound may be analyzed over a predetermined time window and a fast Fourier transform (FFT) may be performed to obtain a frequency distribution characteristic of the captured sound. The detected frequency distribution may be compared to the known acoustic model. If that comparison is favorable, the unknown speaker is identified as a valid user having the identity of the matching voice model. Thus, by comparing the captured sound with the voice models 174, the voice biometrics system 140 may identify the captured sound as speech 106 from a valid user (speaker) or not (e.g., ambient noise 108). In some embodiments, if the comparison is not favorable (e.g., the unknown speaker's voice does not match any of the voice models 174), the enrollment process may be performed to enroll the unknown speaker.

Examples of voice model (or voice template) management are described in (but are not limited to) U.S. patent application Ser. No. 09/760,076, filed Jan. 12, 2001, which is assigned to the assignee of the present disclosure and incorporated herein by reference in its entirety and U.S. patent application Ser. No. 09/703,191, filed Oct. 30, 2000, which is assigned to the assignee of the present disclosure and incorporated herein by reference in its entirety.

The voice biometrics engine 150 may be Large Vocabulary Continuous Speech Recognition (LVCSR), phonetic-based, text-dependent, text independent, or any other suitable type of voice biometrics engine. Enrollment and identification/verification for the voice biometrics engine 150 may be performed based on the type of the voice biometrics engine 150.

For embodiments in which the voice biometrics engine 150 is configured for LVCSR, the LVCSR may be based on a Hidden Markov Model (HMM) for training and recognition of spoken words. The LVCSR-based voice biometrics engine 150 does not split the spoken words into phonemes for training and recognition. Instead, the LVCSR-based voice biometrics engine 150 looks for entire words, as is, for training and recognition.

For embodiments in which the voice biometrics engine 150 is a phonetic-based voice biometrics engine, the words are split into phoneme units or sometimes even into sub-phoneme units. Next, the voice biometrics engine 150 is trained with those phonemes to create a voice model (e.g., 174) for a particular speaker. For embodiments in which the voice biometrics engine 150 is text dependent, text dependent speaker enrollment and identification is performed with a predefined utterance for both training (enrollment) and identification of the speakers.

Figure 3:
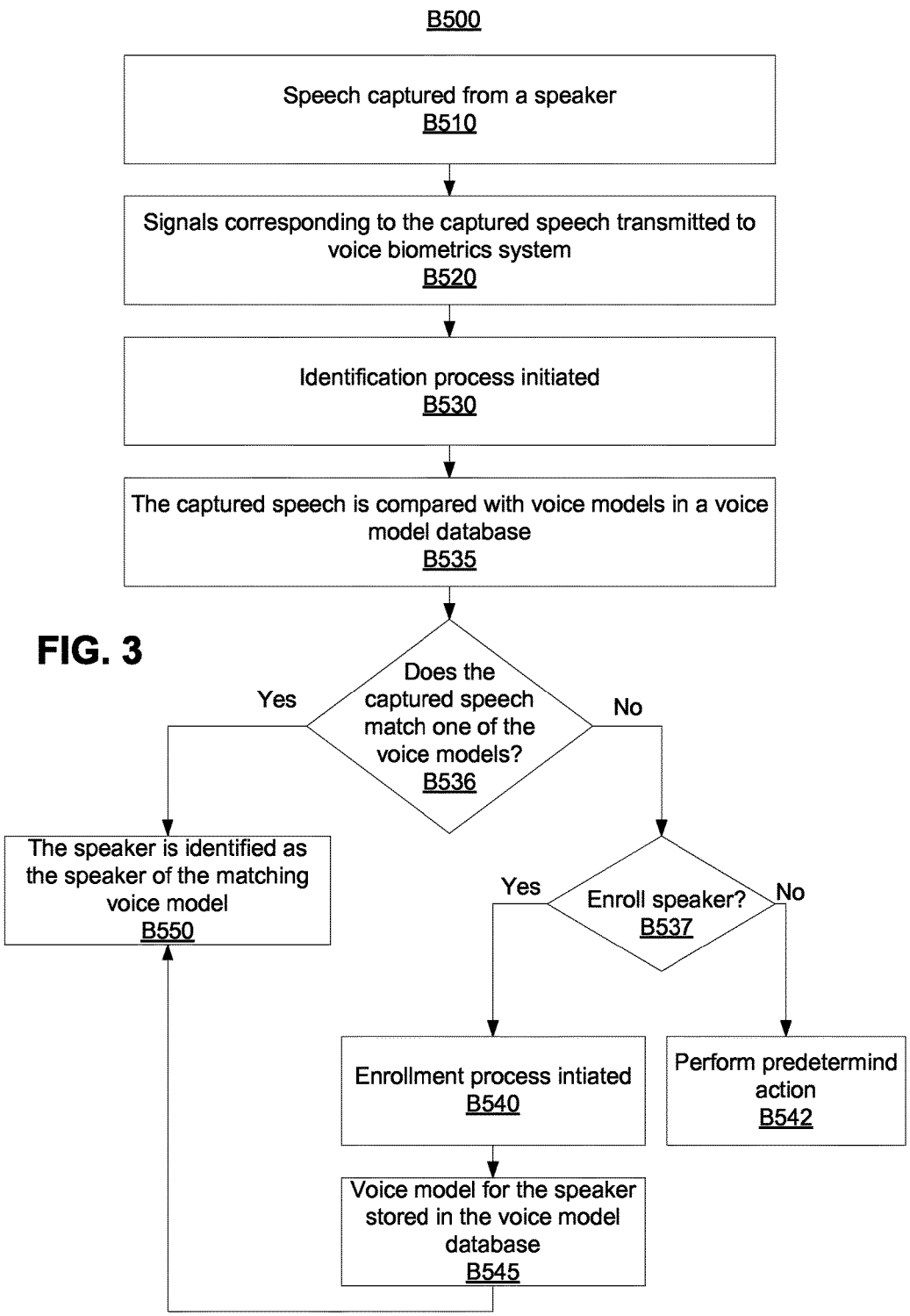
FIG. 3 is a flow chart of a speaker authentication method according to various embodiments of the disclosure.

FIG. 3 illustrates a flow chart of an illustrative method B500 for authenticating (e.g., enrolling and/or identifying) a speaker based on speech (voice sample) of the speaker by the voice biometrics system 140 (e.g., the voice biometrics engine 150) of the SRQI system 104. With reference to FIGS. 1-3, at block B510, one or more of the microphones 110a-110d capture speech (voice) 106 from the speaker. At block B520, one or more signals 118a-118d corresponding to the captured speech 106 is transmitted to the SRQI system 104, for example to the voice biometrics system 140. In particular embodiments, one or more analog-to-digital converters 112a-112d may be used to convert one or more analog signals 111a-111d corresponding to the captured speech 106 into the one or more signals 118a-118d. In some embodiments, a signal is transmitted for less than all of the microphones 110a, 110b (e.g., only microphone 110a, two microphones in an electronics device having three microphones, etc.) to the voice biometrics system 140. In other embodiments, a signal is transmitted for every microphone (e.g., each of the microphones 110a, 110b, 110c, 110d) to the voice biometrics system 140.

At block B530, the voice biometrics system 140 is configured to perform an identification process to identify the speaker. As part of the identification process, at block B535, the speaker's speech 106 (as represented by the one or more signals 118a-118d, 118b) is compared with voice models 174 in the database 173 of voice models on the memory 172.

If the speaker's voice matches one of the voice models 174 (B536: Yes), then at block B550, the speaker is identified as the speaker having the matching voice model. If the speaker's voice does not match any of the voice models 174 in the database 173 (B536: No), then the voice biometrics engine 150 may perform a predetermined action. For instance, in some embodiments, at block B540 (B537: Yes), the voice biometrics system 140 may perform the enrollment process, for instance (but not limited to) as described in the disclosure. This may occur, for example, during an initial use of the SRQI system 104. As such, for example, at block B545, the voice biometrics system 140 may generate at least one voice model 174 for the speaker (e.g., based on a voice sample of the speaker) and store the voice model 174 in the database 172 as part of the enrollment process. After the enrollment process, the method B500 may be configured to proceed to any suitable block. For instance, after the enrollment process, the method B500 may return to block B510 such that speech subsequently captured from the speaker may be compared with the voice model 174 stored during the enrollment process (block B545) to identify the speaker. In addition or in the alternative, the method B500 may proceed to block B550 (or any other block) after the enrollment process as the speaker will have been identified as the newly enrolled speaker.

Alternatively, if the speaker's voice does not match any of the voice models 174 in the database 173 and the enrollment process is not to be initiated (B537: No, e.g., because enrollment has already been performed for a speaker and the captured speech does not match that of the enrolled speaker) then at block B542, the voice biometric system 140 may perform any other suitable predetermined action, such as (but not limited to), providing an indication of an error of a non-match, requesting an additional voice sample, disregarding speech from the user, and/or the like.

In some embodiments, the identification process (e.g., block B530) may be initiated before the enrollment process (e.g., block B540). For instance, if the identification process fails, for example, because the captured speech does not match any voice samples in the database 173, then the enrollment process is initiated. In particular embodiments, the captured speech (as used in the failed identification process) may be used as the voice model 174. In other particular embodiments, new and/or additional speech from the user is captured to generate the voice model 174. In other embodiments, the enrollment process (e.g., block B540) is performed before the identification process (e.g., block B530).

The SRQI system 104 (e.g., the voice biometrics system 140) may be configured to perform the authentication process at any suitable time and/or any suitable number of times. For instance, the voice biometrics engine 140 may authenticate the speaker's speech at predefined intervals (e.g., every five minutes, every five hundred words, etc.) or upon occurrence of predetermined events (e.g., upon usage of the electronics device 102 after a predetermined amount of time, powering on the electronics device 102, enabling the speech recognition system 190 or other related component, a presence of an undesired or unknown sound, etc.). In some embodiments, authentication may be performed at all times, such that, for example, each word or phrase (groups of words, such as a sentence or the like) captured by the microphones 110 is compared with the voice model 174 to ensure that such speech belongs to the authenticated (identified) speaker.

Electronic devices may be used in an environment that may include ambient noise 108 (also referred to as background noise or as undesired sound). As such, in some instances, ambient noise 108 in addition to the speech 106 may be received by one or more of the microphones 110*a*-110*d*. Ambient noise 108 may be, but is not limited to, ancillary or background conversations (i.e., speech from other individuals), music or other media playing, and/or the like. In particular embodiments, ambient noise 108 may refer to undesired sound or any noise other than speech 106 from the speaker. Quality of sound being provided as input to a speech recognition system for processing may be affected by the presence of ambient noise 108.

Thus in various embodiments, the SRQI system 104 includes a directional sound capturing system 180 configured to discriminate, based on the voice biometrics of the identified speaker (e.g., as identified in the method B500), speech from the identified speaker against undesired sound (e.g., ambient noise, background conversations, etc.) such that the desired sound is provided to and/or processed by the speech recognition system 190 while reducing undesired sound being provided to and/or processed by the speech recognition system 190.

In some embodiments, the SRQI system 104 (e.g., the directional sound capturing system 180) may be configured to identify an area from which speech is coming from the speaker based on voice biometrics (e.g., voice model 174 as provided in block B540-545) of the speaker such that sound in the identified area is emphasized relative to sounds from other areas.

For instance, the directional sound capturing system 180 may capture or process sound coming from an area or direction of the speaker for providing to the speech recognition system 190 and not capture or process sound in the other areas or directions or otherwise mitigate such sound from being provided to and/or processed by the speech recognition system 190.

For example, in some embodiments, when the electronics device 102 is orientated such that desired sound (e.g., speech determined to match the voice sample 174 of the speaker) arrives from a direction in area A1, the directional sound capturing system 180 may be configured to use a (first) filter that is directional to the area A1 and tends to attenuate audio coming from other directions (e.g., area A2, area A3). Likewise, when the electronics device 102 is oriented such that desired speech arrives from a direction in area A2, the directional sound capturing system 180 may be configured to use a second filter that is directional to the area A2 and tends to attenuate audio coming from other directions (e.g., area A1, area A3). When the electronics device 102 is oriented such that desired speech arrives from a direction in area A3, the directional sound capturing system 180 may be configured to use a third filter, which is directional to the area A3, and tends to attenuate audio coming from other directions (e.g., area A1, area A2).

For various embodiments, it is noted that the area boundaries shown in FIG. 1 are for visual illustrative purposes only. The illustrated boundaries do not purport to show the actual boundaries between areas associated with the various orientation states of the electronics device 102. In some embodiments, two or more of the filters may perform equally well for a sound source that is beyond some distance from the electronics device (such an orientation is also called a "far-field scenario"). This distance may depend largely on the distance between the microphones 110 of the electronics device 102. In some embodiments, two areas may overlap such that the two corresponding filters may be expected to perform equally well for a desired source located in the overlap region. In some embodiments, the areas may be predetermined in shape or size (e.g., area or volume) relative to the electronics device 102. For example, four areas may be provided to represent four quadrants around the electronics device 102 (e.g., sound coming from a direction toward bottom left of the device, bottom right of the device, top left of the device, and top right of the device). In other embodiments, the directional sound capturing system 180 may be configured to enter a single-channel mode such that only one microphone is active (e.g., microphone 110*a*, 110*b*, 110*c*, or 110*d*) or such that the microphones currently active are mixed down to a single channel, and possibly to suspend spatial processing operations. In some embodiments, the microphones 110 may be part of and/or controlled by the directional sound capturing system 180.

In some embodiments, the directional sound capturing system 180 is associated and discrete from the voice biometrics system 140. In other embodiments, the directional sound capturing system 180 includes or is integrated with the voice biometrics system 140 or portions thereof.

Figure 4A:
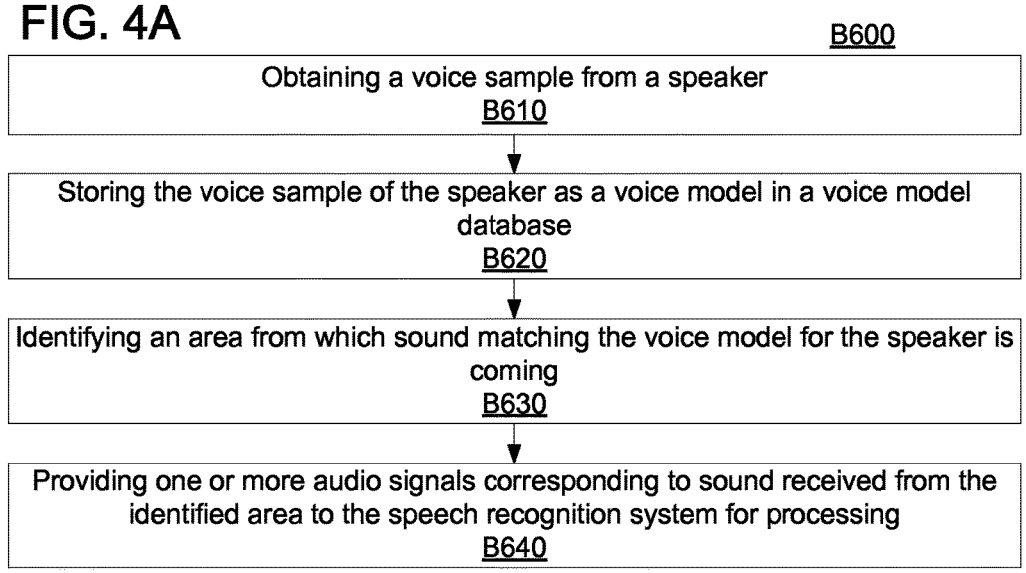
FIG. 4A illustrates a flow chart of a method for improving speech quality recognition according to various embodiments of the disclosure.
Figure 4B:
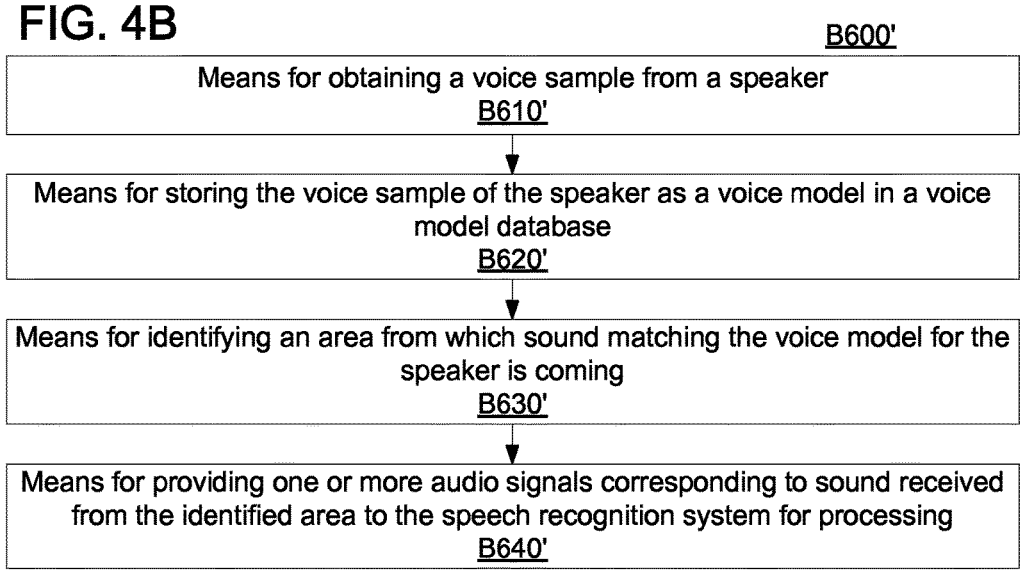
FIG. 4B illustrates a flow chart of a method for improving speech quality recognition according to various embodiments of the disclosure.

FIG. 4A illustrates a method B600 for improving quality of speech recognition performed by a speech recognition system (e.g., 190) according to various embodiments of the disclosure. FIG. 4B illustrates means-plus-function blocks B600' for improving quality of speech recognition performed by a speech recognition system (e.g., 190) according to various embodiments of the disclosure. One or more of the method B600 and the means-plus-function blocks B600' may be implemented with or as part of the SRQI system 104 (e.g., FIGS. 1-3) and/or (but not limited to) any of the other embodiments of the disclosure. Although one or more of the method B600 and the means-plus-function blocks B600' may include features similar or used with the embodiments of FIGS. 1-3, it should be understood that one or more of the method B600 and the means-plus-function blocks B600' may also include (but not limited to) some or all of the same features and operate in a manner similar to that shown and described in the embodiments of FIG. 5-8. In addition, some or all of the features shown in FIGS. 1-3 and 5-8 may be combined in various ways and included in one or more of the embodiments relating to FIGS. 4A and 4B. Likewise, it should be understood that any of the features of the embodiments relating to FIGS. 4A and 4B may be combined or otherwise incorporated into any other embodiments relating to FIGS. 4A and 4B as well as (but not limited to) any other embodiment herein discussed.

With reference to FIGS. 1-4A, in various embodiments, the SRQI system 104 via implementation of the method B600 is configured to identify an area or a direction from which a desired sound, such as speech from the speaker, is coming based on the voice biometrics (e.g., voice model 174) of the speaker (e.g., as performed in the method B500) such that sound in the area or coming from the direction is emphasized relative to sounds in other areas or coming from other directions (in which the desired sound is not in or coming from). For instance, sound in the area or coming from the direction may be captured and/or provided to the speech recognition system 190 for processing whereas sounds from the other areas or directions are not captured and/or processed by the speech recognition system 190.

At blocks B610 and B620, a voice sample is obtained from the user and stored as a voice model 174 in a database 173 of voice models, for example as part of or similar to the authentication method B500, such as the enrollment process (e.g., blocks B540-B545), and/or the like.

Sound from one or more of the areas A1, A2, A3 may be detected or otherwise captured using the microphones 110 (e.g., microphone 110*a* and microphone 110*b*). The captured sound may include desired sound (e.g., speech 106 from the identified speaker) and undesired sound (e.g., ambient noise 108). At block B630, the SRQI system 104 may identify an area from which sound matching the voice model for the speaker is coming. For instance, the SRQI system 104 may capture sound with one or more of the microphones 110 from a first area (e.g., A1) of the one of more areas A1-A3 in any suitable manner, such as using through filtering (e.g., as discussed in the disclosure and/or the like), selective use of the microphones (e.g., emphasizing sound captured by one or more of the microphones 110*a*-110*d* nearest and/or associated with the first area A1), and/or the like. Accordingly, at block B730, audio signals corresponding to the sound coming from the first area (e.g., A1) captured by the one or more microphones 110 is received by the SRQI 104.

Then the SRQI system 104 may determine whether the received audio signals corresponding to the sound coming from the first area A1 match the voice model 174 for the speaker. For instance, the SRQI system may compare the captured sound (as represented in the signals) with the voice model 174 to identify the sound (or source thereof), for example as part of or similar to the authentication method B500, such as the identification process (e.g., blocks B530-B550), and/or the like. By comparing the captured sound with the voice model 174, the captured sound may be determined to be speech 106 from the speaker or ambient noise 108.

At block B640, based upon the determination of the captured sound, the SRQI 104 may selectively take appropriate action depending upon whether the captured sound is identified as speech 106 from the speaker or ambient noise 108. For instance, if the captured speech coming the first area A1 is determined to be speech 106 from the valid speaker, the SRQI 104 may emphasize or amplify sound captured from the first area A1 (relative to sounds coming from the other areas A2, A3) and/or take other appropriate action such that captured sound coming from the first area A1 is provided to the speech recognition system 190. In some embodiments, amplifying sound or taking other appropriate action may include reducing noise disturbances associated with a source of sound. For example, the directional sound capturing system 180 may use a corresponding filter F10-1 through F10-*n* (e.g., refer to FIG. 5). Likewise, if the captured sound coming from the first area A1 is determined to be ambient noise 108, the SRQI system 104 may not provide sounds coming from the first area A1 to the speech recognition system 190. For instance, the SRQI system 104 may filter out or otherwise deemphasize sounds coming from the first area A1 or take other appropriate action.

After block B640, the method B600 may be repeated for a second area (e.g., A2) and any other areas, such as a third area (e.g., A3), to determine whether any of the sounds from those areas is speech from the speaker and, based on the determinations, to selectively provide audio signals corresponding to sounds from each of the areas to the speech recognition system 190.

Accordingly, for example, for each of the second area A2 and the third area A3, the captured sound coming from each area may be characterized and compared to the database 173 of voice models 174. If the captured sound coming from each area does not match the voice models, the SRQI system 104 may determine that the captured sound coming from the second area A2 and the third area A3 is ambient noise 108. For the first area A1, the captured sound coming from the area A1 may be characterized and compared to the database 173 of voice models 174. If the captured sound matches the voice model 174, the captured sound may be identified as the speech 106 from the speaker (matching the voice model). As a result, because the speech 106 is coming from the first area A1, the sound in the first area A1 continues to be captured and/or provided to the speech recognition system 190 whereas sounds from the second area A2 and the third area A3 are attenuated or otherwise not provided to the speech recognition system 190.

In some embodiments, the voice sample 174 is obtained with one or more of the microphones 110. In other embodiments, the voice sample is obtained using a different microphone, for example, of a home computer or the like.

The method B600 described in FIG. 4A above may be performed by various hardware and/or software component(s) and/or module(s) corresponding to the means-plus-function blocks B600' illustrated in FIG. 4B. In other words, blocks B610 through B640 illustrated in FIG. 4A correspond to means-plus-function blocks B610' through B640' illustrated in FIG. 4B.

In some embodiments, the SRQI system 104 may be configured to separate (filter) undesired sound (e.g., ambient noise) using any suitable signal processing techniques or other techniques from desired sound (e.g., speech matching the identified speech) based on the voice biometrics (e.g., voice model 174) of the speaker to produce a resulting signal that is provided to the speech recognition system 190 for processing. For instance, in particular embodiments, the SRQI system 104 may be configured to separate undesired sound from an area in which sound from the authenticated speaker is coming.

Figure 5:
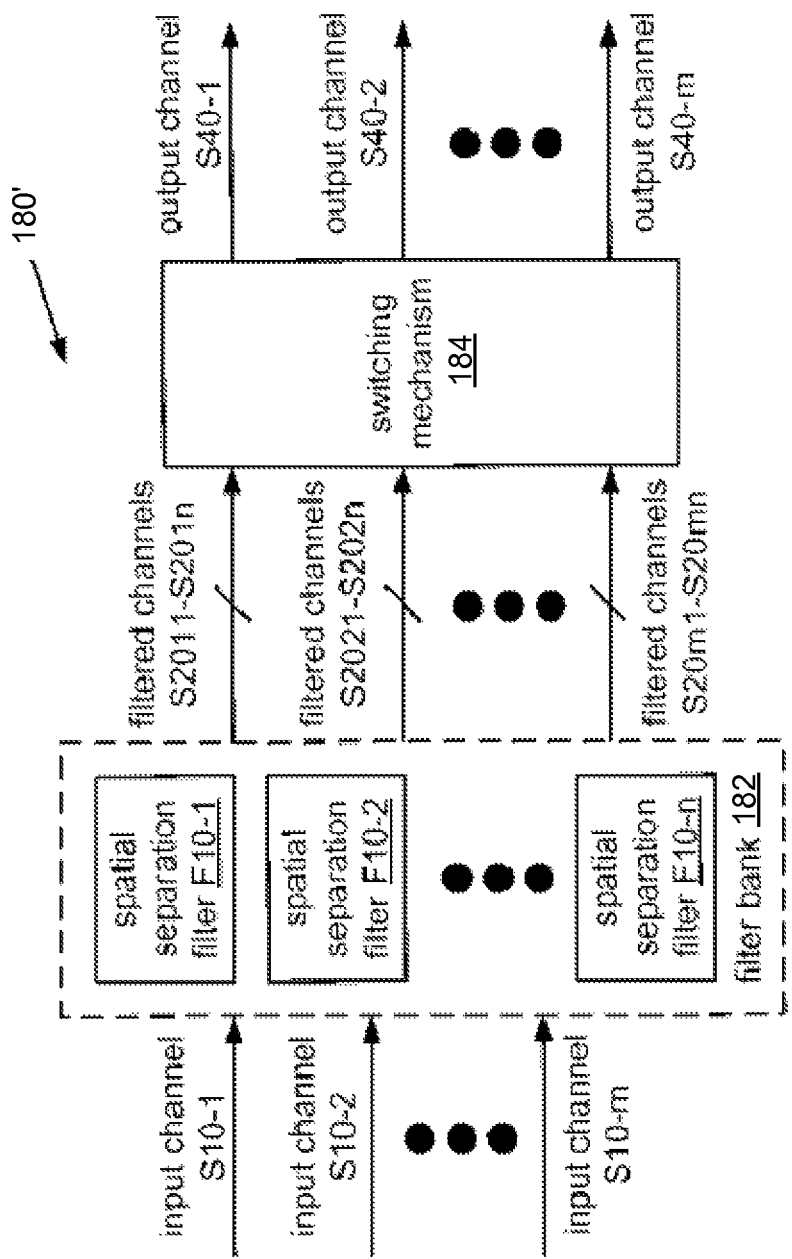
FIG. 5 is a block diagram of a directional sound capturing system according to various embodiments of the disclosure.

FIG. 5 shows a block diagram of an illustrative directional sound capturing system 180' according to various embodiments of the disclosure. The directional sound capturing system 180' may be implemented with the SRQI system 104 (e.g., FIGS. 1-4B) and/or (but not limited to) any of the other embodiments of the disclosure. For instance, the directional sound capturing system 180' may include similar features as, employed as, and/or provided with an embodiment of the directional sound capturing system 180 (e.g., FIG. 3) and/or (but not limited to) any of the other embodiments of the disclosure. Although the directional sound capturing system 180' may include features similar or used with the embodiments of FIGS. 1-4B, it should be understood that the directional sound capturing system 180' may also include (but is not limited to) some or all of the same features and operate in a manner similar to that shown and described in the embodiments of FIG. 6A-8. In addition, some or all of the features shown in FIGS. 1-4B and 6A-8 may be combined in various ways and included in the embodiments relating to FIG. 5. Likewise, it should be understood that any of the features of the embodiments relating to FIG. 5 may be combined or otherwise incorporated into any other embodiments relating to FIG. 5 as well as (but not limited to) any other embodiment herein discussed.

In various embodiments, the sound capturing system 180' is configured to separate undesired sound (e.g., ambient noise 108) from desired sound (e.g., speech matching the identified speech) based on the voice biometrics (e.g., voice model 174) of the speaker to produce a resulting signal 192 that is fed to the speech recognition system 190 for processing.

With reference to FIGS. 1-5, in some embodiments, the directional sound capturing system 180' includes a filter bank 182 that is configured to receive an M-channel input signal S10, where M is an integer greater than one and each of the M channels is based on an output signal (e.g., 118a-118d) of a corresponding one of M microphones (e.g., the microphones 110a-110d). In various embodiments, the microphone signals may be (but is not limited to any one or combination of) sampled, pre-processed (e.g., filtered for echo cancellation, noise reduction, spectrum shaping, etc.), pre-separated (e.g., by another spatial separation filter or adaptive filter as described in the disclosure). For acoustic applications, such as speech, sampling rates may range for example from 8 kHz to 16 kHz.

The filter bank 182 may include n spatial separation filters F10-1 to F10-$n$ (where n is an integer greater than one), each of which is configured to filter the M-channel input signal S10 to produce a corresponding spatially processed M-channel signal. Each of the spatial separation filters F10-1 to F10-$n$ is configured to separate one or more directional desired sound components (speaker's speech 106) of the M-channel input signal from one or more other components of the signal (e.g., ambient noise 108).

For instance, the filter F10-1 produces an M-channel signal that includes filtered channels S2011 to S201$n$, the filter F10-2 produces an M-channel signal that includes filtered channels S2012 to S202$n$, and so on. Each of the filters F10-1 to F10-$n$ may be characterized by one or more matrices of coefficient values, which may be calculated using a blind source separation (BSS), beamforming, or combined BSS/beamforming method (e.g., an ICA, or IVA method or a variation thereof) and/or may be trained (e.g., based on the voice model 174). In some cases, a matrix of coefficient values may be only a vector (i.e., a one-dimensional matrix) of coefficient values. In various embodiments, the one or more of the filters F10-1 may be configured based on the speaker's voice model 174 to separate speech 106 matching the speaker's voice 174 from ambient noise 108.

The directional sound capturing system 180' may also includes a switching mechanism 184 that is configured to receive the M-channel filtered signal from each filter F10-1 to F10-$n$ to determine which of these filters currently best separates at least one desired component of the input signal S10 from one or more other components, and to produce an M-channel output signal S40 accordingly.

The M-channel output signal S40 (e.g., 192 in FIG. 2), which is provided by the filter determined by the switching mechanism 184 to best separate the at least one desired component (e.g., speech) from one or more other components (e.g., ambient noise) may be transmitted to the speech recognition system 190. Thus, for example, if speech from the identified speaker is coming in a direction from the area A3 (toward the microphone 110b), the switching mechanism 184 may determine that the filter F10-2 best separates the speech from ambient noise. Accordingly, the output channel signal S40-2 may be transmitted to the speech recognition system 190. As such, by selecting the filter F10-2, sound, including the speech, coming from the direction from the area A3 is fed to the speech recognition system 190 whereas sound coming from directions of the other areas A1, A2 is at least partially attenuated.

In some embodiments, the SRQI system 104 (e.g., the directional sound capturing system 180, 180') may implement beamforming. Beamforming techniques use the time difference between channels that results from the spatial diversity of the microphones to enhance a component of the signal that arrives from a particular direction. More particularly, it is likely that one of the microphones will be oriented more directly at the desired source (e.g., the user's mouth), whereas the other microphone may generate a signal from this source that is relatively attenuated. These beamforming techniques are methods for spatial filtering that steer a beam towards a sound source, putting a null at the other directions. Beamforming techniques make no assumption on the sound source but assume that the geometry between source and sensors, or the sound signal itself, is known for the purpose of dereverberating the signal or localizing the sound source. For instance, in some embodiments, one or more of the filters of the filter bank 182 may be configured according to a data-dependent or data-independent beamformer design (e.g., a superdirective beamformer, leastsquares beamformer, or statistically optimal beamformer design). In the case of a data-independent beamformer design, the beam pattern may be shaped to cover a desired spatial area (e.g., by tuning the noise correlation matrix).

FIGS. 6A and 6B show block diagrams of illustrative directional sound capturing system 200a, 200b according to various embodiments of the disclosure. One or more of the directional sound capturing systems 200a, 200b may be implemented with the SRQI system 104 (e.g., FIGS. 1-5) and/or (but not limited to) any of the other embodiments of the disclosure. For instance, one or more of the directional sound capturing systems 200a, 200b may include similar features as, employed as, and/or provided with an embodiment of the directional sound capturing systems 180, 180' (e.g., FIGS. 2 and 5) and/or (but not limited to) any of the other embodiments of the disclosure. Although one or more of the directional sound capturing systems 200a, 200b may include features similar or used with the embodiments of FIGS. 1-5, it should be understood that one or more of the directional sound capturing systems 200a, 200b may also include (but is not limited to) some or all of the same features and operate in a manner similar to that shown and described in the embodiments of FIG. 7A-8. In addition, some or all of the features shown in FIGS. 1-5 and 7A-8 may be combined in various ways and included in one or more of the embodiments relating to FIGS. 6A and 6B. Likewise, it should be understood that any of the features of the embodiments relating to FIGS. 6A and 6B may be combined or otherwise incorporated into any other embodiments relating to FIGS. 6A and 6B as well as (but not limited to) any other embodiment herein discussed.

With reference to FIGS. 1-6A, in various embodiments, the directional sound capturing system 200a (in addition to or in place of the sound capturing system 180) is configured to separate undesired sound (e.g., ambient noise 108) from desired sound (e.g., speech matching the identified speech) based on the voice biometrics (e.g., voice model 174) of the speaker to produce a resulting signal 192 that is fed to the speech recognition system 190 for processing.

In some embodiments, the directional sound capturing system 200a may include a beamformer 214 and/or a noise reference refiner 220a. The directional sound capturing system 200a may be configured to receive digital audio signals 212a, 212b. The digital audio signals 212a, 212b may or may not have matching or similar energy levels. The digital audio signals 212a, 212b may be signals from audio sources (e.g., the signals 118a, 118b from the microphones 110a, 110b in the electronics device 102). The digital audio signals 212a, 212b may have matching or similar signal characteristics. For example, both signals 212a, 212b may include a desired audio signal (e.g., speech 106). The digital audio signals 212a, 212b may also include ambient noise 108.

The digital audio signals 212a, 212b may be received by the beamformer 214. One of the digital audio signals 212a may also be routed to the noise reference refiner 220a. The beamformer 214 may generate a desired audio reference signal 216 (e.g., a voice/speech reference signal). The beamformer 214 may generate a noise reference signal 218. The noise reference signal 218 may contain residual desired audio. The noise reference refiner 220a may reduce or effectively eliminate the residual desired audio from the noise reference signal 218 in order to generate a refined noise reference signal 222a. The noise reference refiner 220a may utilize one of the digital audio signals 212a, 212b to generate a refined noise reference signal 222a. The desired audio reference signal 216 and the refined noise reference signal 222a may be utilized to provide the resulting signal 192, which has improved desired audio output. For example, the refined noise reference signal 222a may be filtered and subtracted from the desired audio reference signal 216 in order to reduce noise in the desired audio. The desired audio reference signal 216 and the refined noise reference signal 222a and/or the resulting signal 192 (e.g., a signal resulting from subtracting the refined noise reference signal 222a from the desired audio reference signal 216) may be transmitted to the speech recognition system 190. In some embodiments, the refined noise reference signal 222a and the desired audio reference signal 216 may also be further processed to reduce noise in the desired audio.

With reference to FIGS. 1-6B, in various embodiments, the directional sound capturing system 200b (in addition to or in place of the sound capturing system 180 and/or 200a) is configured to separate undesired sound (e.g., ambient noise 108) from desired sound (e.g., speech matching the identified speech) based on the voice biometrics (e.g., voice model 174) of the speaker to produce a resulting signal 192 that is fed to the speech recognition system 190 for processing.

The directional sound capturing system 200b may include digital audio signals 212a, 212b, a beamformer 214, a desired audio reference signal 216, a noise reference signal 218, a noise reference refiner 220b, and a refined noise reference signal 222b. As the noise reference signal 218 may include residual desired audio, the noise reference refiner 220b may reduce or effectively eliminate residual desired audio from the noise reference signal 218. The noise reference refiner 220b may utilize both digital audio signals 212a, 212b in addition to the noise reference signal 218 in order to generate a refined noise reference signal 222b. The refined noise reference signal 222b and the desired audio reference signal 216 may be utilized to provide the resulting signal 192, which has improved desired audio output. The desired audio reference signal 216 and the refined noise reference signal 222b and/or the resulting signal 192 (e.g., a signal resulting from subtracting the refined noise reference signal 222b from the desired audio reference signal 216) may be transmitted to the speech recognition system 190. In some embodiments, the refined noise reference signal 222b and the desired audio reference signal 216 may also be further processed to reduce noise in the desired audio. Further illustrative beamformer and/or noise reference refiner examples are disclosed in (but are not limited to) U.S. application Ser. No. 12/334,246 (filed on Dec. 12, 2008); Ser. No. 12/323,200 (filed on Nov. 25, 2008), all of which are assigned to Qualcomm, Inc. and are incorporated by reference in their entirety.

It should be noted that the directional sound capturing systems, components, and/or configurations thereof discussed with respect to FIGS. 5-6B as well as any other embodiments discussed in the disclosure are merely illustrative. Further non-limiting examples of systems and methods for separating an undesired sound from a desired sound or otherwise emphasizing a desired sound (e.g., sound, such as speech, coming from a desired direction) and attenuating undesired sound (e.g., ambient sound) are disclosed in (but are not limited to) U.S. application Ser. No. 12/334,246 (filed on Dec. 12, 2008); U.S. application Ser. No. 12/323, 200 (filed on Nov. 25, 2008); U.S. application Ser. No. 12/473,492 (filed on May 28, 2009); U.S. application Ser. No. 12/277,283 (filed on Nov. 24, 2008); U.S. application Ser. No. 12/796,566 (filed on Jun. 8, 2010); U.S. Pat. No. 7,464,029 (filed on Jul. 22, 2005), all of which are assigned to Qualcomm, Inc. and are incorporated by reference in their entirety. Such systems and methods, for instance, may be used in placed of or in addition to the directional sound capturing systems 180, 200a, 20b (e.g., FIGS. 1-6B).

Figure 7A:
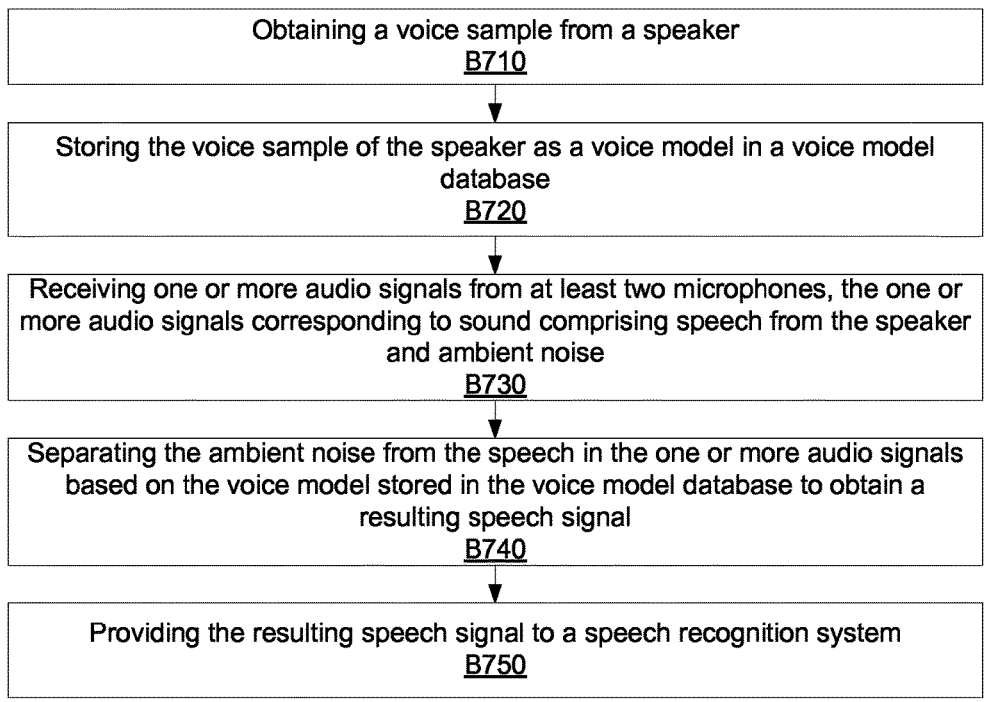
FIG. 7A illustrates a flow chart of a method for improving speech quality recognition according to various embodiments of the disclosure.
Figure 7B:
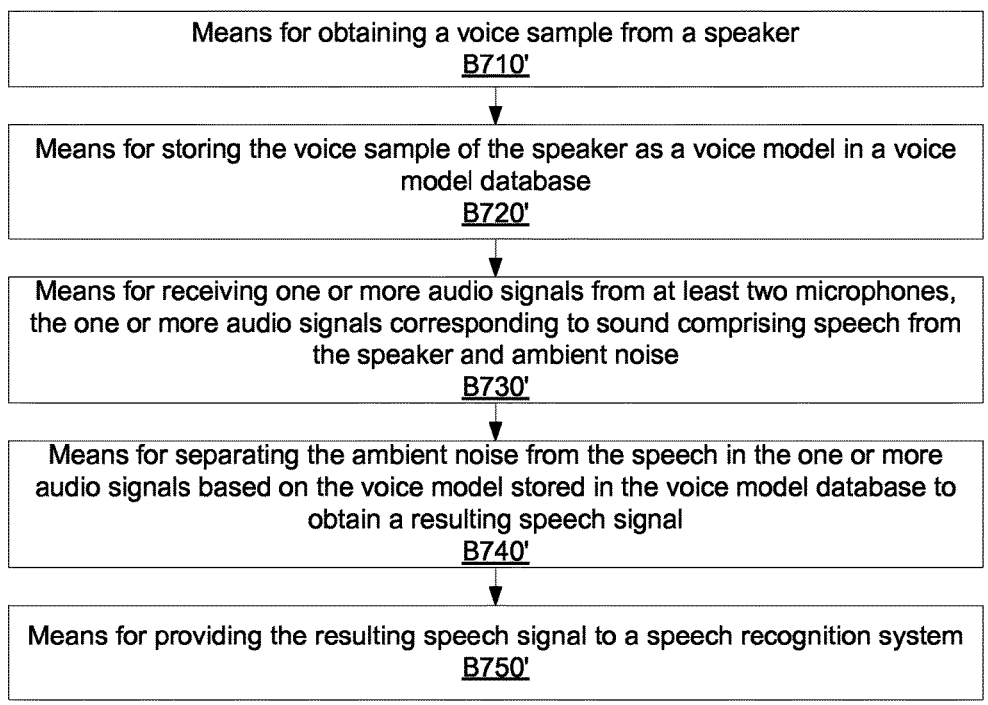
FIG. 7B illustrates a flow chart of a method for improving speech quality recognition according to various embodiments of the disclosure.

FIG. 7A illustrates a method B700 for improving quality of speech recognition performed by a speech recognition system (e.g., 190) according to various embodiments of the disclosure. FIG. 7B illustrates means-plus-function blocks B700' for improving quality of speech recognition performed by a speech recognition system (e.g., 190) according to various embodiments of the disclosure. One or more of the method B700 and the means-plus-function blocks B700' may be implemented with or as part of the SRQI system 104 (e.g., FIGS. 1-6B) and/or (but not limited to) any of the other embodiments of the disclosure. For instance, at least a portion of the method B700 and/or the means-plus-function blocks B700' may be implemented by the directional sound capturing system 180, 180', 200a, 200b (e.g., FIGS. 2 and 5-6B) and/or (but not limited to) any of the other embodiments of the disclosure. Although one or more of the method B700 and the means-plus-function blocks B700' may include features similar or used with the embodiments of FIGS. 1-6B, it should be understood that one or more of the method B700 and the means-plus-function blocks B700' may also include (but is not limited to) some or all of the same features and operate in a manner similar to that shown and described in the embodiments of FIG. 8. In addition, some or all of the features shown in FIGS. 1-6B and 8 may be combined in various ways and included in one or more of the embodiments relating to FIGS. 7A and 7B. Likewise, it should be understood that any of the features of the embodiments relating to FIGS. 7A and 7B may be combined or otherwise incorporated into any other embodiments relating to FIGS. 7A and 7B as well as (but not limited to) any other embodiment herein discussed.

With reference to FIGS. 1-7A, at blocks B710 and B720, a voice sample is obtained from the user and stored as a voice model 174 in a database 173 of voice models, for example as part of in a manner similar to the authentication method B500, such as the enrollment process (e.g., blocks B540-B545), and/or the like.

The SRQI system 104 (e.g., the microphones 110a-110d) may capture sound. The captured sound may include desired sound (e.g., speech 106 from a speaker matching the voice model provided in blocks B710 and B720) and undesired sound (e.g., ambient noise 108). Accordingly, at block B730, one or more audio signals corresponding to the sound captured by at least two of the microphones 110 is received by the SRQI system 104.

At block B740, the SRQI system 104 (e.g., the directional sound capturing system 180) may separate (e.g., filters out, attenuates, etc.) the ambient noise 108 from the speech 106 in the one or more audio signals based on the voice model 174 stored in the database 173 using any suitable signal processing techniques or other techniques to obtain a resulting speech signal 192. That is, based on the voice model 174 of the speaker, undesired sound (e.g., ambient noise) may be separated using any suitable signal processing techniques or other techniques from desired sound, such as speech matching the voice model 174. For instance, the voice model 174 may provide a reference for filtering undesired audio (e.g., ambient noise 108) from speech 106 (desired audio) matching the voice model 174 to produce the resulting speech signal 192 that is fed to the speech recognition system 190 for processing. For example, sound from other areas than that of the area in which the identified speaker is located may be subtracted from sounds of the speaker's area. At block B750, the SRQI system 104 (e.g., directional sound capturing system 180) provides the resulting speech signal 192 to the speech recognition system 190.

The method B700 described in FIG. 7A above may be performed by various hardware and/or software component(s) and/or module(s) corresponding to the means-plus-function blocks B700' illustrated in FIG. 7B. In other words, blocks B710 through B740 illustrated in FIG. 7A correspond to means-plus-function blocks B710' through B740' illustrated in FIG. 7B.

Figure 8:
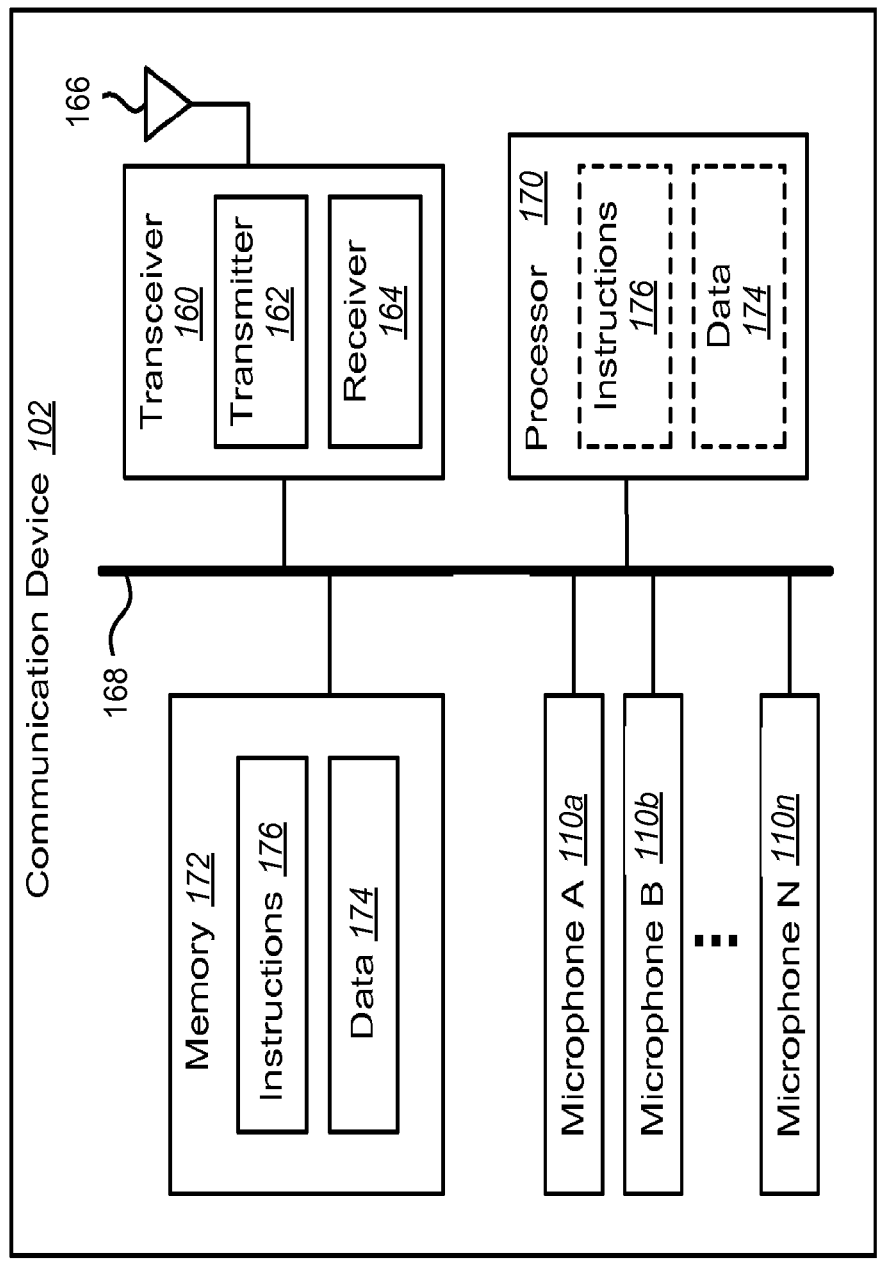
FIG. 8 is a block diagram illustrating a communication device according to various embodiments of the disclosure.

FIG. 8 illustrates certain components that may be included within an electronics device (e.g., 102 in FIGS. 1-4B) according to various embodiments of the disclosure. The electronics device 102 may include a SRQI system 104 and/or be implemented with any of the features of the embodiments relating to FIGS. 1-7B.

With reference to FIGS. 1-8, the electronics device 102 includes a processor 170. The processor 170 may be a general purpose single or multi-chip microprocessor (e.g., an ARM), a special purpose microprocessor (e.g., a digital signal processor (DSP)), a microcontroller, a programmable gate array, etc. The processor 170 may be referred to as a central processing unit (CPU). The processor may be a single processor 170 or a combination of processors (e.g., an ARM and DSP) depending on the embodiment.

The electronics device 102 may include a memory 172. The memory 172 may be any electronic component capable of storing electronic information. The memory 172 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 174 and instructions 176 may be stored in the memory 172. The data 174 and/or the instructions 176 may relate to the voice biometrics portion, the directional sound capturing system 180, and/or the speech recognition system 190 of the electronics device. In some embodiments, the SRQI system 104, portions thereof, and/or methods of implementation may be provided on the memory 172. For example, the data 174 may include the voice models 174 and/or the instructions 176 may include instructions for executing the voice biometrics engine 150 and/or the directional sound capturing system 180 or the like. The instructions 176 may be executable by the processor 170 to implement the methods disclosed in the disclosure. Executing the instructions 176 may involve the use of some of the data 174 that is stored in the memory 172. The electronics device 102 may also include multiple microphones 110a, 110b, through 110n. The microphones 110 may receive audio signals that include speech 106 and/or ambient noise 108.

In some embodiments, the electronics device 102 may also include a transmitter 162 and a receiver 164 to allow wireless transmission and reception of signals between the communication device 102 and a remote location. The transmitter 162 and the receiver 164 may be collectively referred to as a transceiver 160. An antenna 166 may be electrically coupled to the transceiver 160. The communication device 102 may also include (not shown) multiple transmitters, multiple receivers, multiple transceivers and/or multiple antenna. The various components of the communication device 102 may be coupled by one or more buses 168, which may include a power bus, a control signal bus, a status signal bus, a data bus, and/or the like.

In some embodiments, the SRQI system 104 may omit the directional sound capturing system 180 such that the speech 106 (e.g., speech used to identify or enroll the speaker and/or subsequent speech from the speaker) from a speaker identified by the voice biometrics system 140 may be input into the speech recognition system 190 for performing functions based on the input without.

Various embodiments as described in the disclosure may be incorporated into an electronic device that accepts speech input in order to control certain functions, or may otherwise benefit from separation of desired noises from background noises, such as communication devices. Many applications may benefit from enhancing or separating clear desired sound from background sounds originating from multiple directions. Such applications may include human-machine interfaces in electronic or computational devices that incorporate capabilities such as voice recognition and detection, speech enhancement and separation, voice-activated control, and the like.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method for improving speech recognition by a speech recognition system, comprising:
   receiving, from each of a plurality of microphones of a device, a microphone output signal, at least one of the microphone signals comprising a voice sample;
   authenticating, by a voice biometrics engine of the device, a speaker based on the voice sample comprising:
      providing to the voice biometrics engine, the received microphone output signals, and
      determining, by the voice biometrics engine, a voice model matching the voice sample, the voice model corresponding to an authenticated speaker, the voice model being one of a plurality of stored voice models;
   providing, by the voice biometrics engine to the directional sound capturing system, an indication of a microphone associated with the matching voice sample;
   providing, to a directional sound capturing system of the device, the received microphone output signals;
   identifying an area from which the microphone output signal comprising the matching voice sample is received;
   filtering, by the directional sound capturing system, subsequent received subsequent microphone output signals based on the identified area, the subsequent microphone output signals comprising subsequent voice samples;
   providing at least one filtered subsequent microphone output signals to the speech recognition system for processing; and
   at predefined intervals, performing the authenticating, by the voice biometrics engine, the authenticated speaker based on at least one filtered subsequent microphone output signal.

2. The method according to claim 1, wherein said identifying comprises, from the plurality of microphone output signals, producing the at least one filtered subsequent microphone output signals.

3. The method according to claim 1, wherein said receiving the microphone output signal comprises receiving the microphone output signal from a first area proximate the plurality of microphones, and
   wherein said method comprises receiving second microphone output signals from a second area proximate the plurality of microphones, the second area being different from the first area, at least one of the second microphone signals comprising a second voice sample, and
   wherein said identifying the area comprises determining whether the second voice sample from the second area matches at least one of the plurality of stored voice models.

4. The method according to claim 1, wherein said method comprises separating ambient noise from speech, based on the voice model, to produce the at least one filtered subsequent microphone output signals.

5. The method according to claim 1, wherein said identifying the area is performed by the voice biometrics engine, and wherein said directional sound capturing system is separate from the voice biometrics engine.

6. A method for improving speech recognition by a speech recognition system, said method comprising:
by a voice biometrics system of a device, receiving at least one of a plurality of microphone output signals, wherein each among the plurality of microphone output signals is associated with a corresponding microphone within a plurality of microphones of the device;
by the voice biometrics system, determining that sound within the received at least one microphone output signal matches a voice model; and
by a directional sound capturing system of the device that is separate from the voice biometrics system:
receiving the plurality of microphone output signals, and
in response to said determining, providing to a speech recognition system an audio signal that is based on the received each of the plurality of microphone output signals and in which sound from a first direction relative to the plurality of microphones is emphasized relative to sound from a second direction relative to the plurality of microphones.

7. The method according to claim 6, wherein said method comprises storing a plurality of voice models in a voice model database, and wherein the voice model is one of the plurality of stored voice models.

8. The method according to claim 6, wherein said method comprises:
at predefined intervals during said providing, by the voice biometrics system, determining that sound within the received at least one microphone output signal matches the voice model.

9. The method according to claim 8, wherein said predefined intervals are predetermined numbers of words.

10. The method according to claim 6, wherein said determining that sound within the received at least one microphone output signal matches the voice model comprises:
by the voice biometrics system and from one among the received at least one microphone output signal, obtaining a voice sample; and
by the voice biometrics system, determining that the voice sample matches the voice model.

11. The method according to claim 10, wherein said receiving at least one of the plurality of microphone output signals comprises receiving, by the voice biometrics system, at least two of the plurality of microphone output signals, and
wherein said receiving at least two of the plurality of microphone output signals comprises receiving, by the voice biometrics system, each one of the at least two microphone output signals separately from each other one of the at least two microphone output signals.

12. The method according to claim 6, wherein said receiving at least one of the plurality of microphone output signals comprises receiving, by the voice biometrics system, at least two of the plurality of microphone output signals, and
wherein said receiving at least two of the plurality of microphone output signals comprises receiving, by the voice biometrics system, each one of the at least two microphone output signals separately from each other one of the at least two microphone output signals.

13. An apparatus to improve speech recognition by a speech recognition system, said apparatus comprising:
a voice biometrics system arranged to receive a plurality of microphone output signals, wherein each among the plurality of microphone output signals is associated with a corresponding microphone of a plurality of microphones of the apparatus, and configured to determine that sound within the received each microphone output signal matches a voice model; and
a directional sound capturing system that is arranged to receive the plurality of microphone output signals, coupled to and separate from the voice biometrics system, coupled to a speech recognition system, and configured to provide, based on said determination by the voice biometrics system, an audio signal to the speech recognition system that is based on the plurality of microphone output signals.

14. The apparatus according to claim 13, wherein, within the audio signal, sound from a first direction relative to the plurality of microphones is emphasized relative to sound from a second direction relative to the plurality of microphones.

15. The apparatus according to claim 13, wherein said apparatus comprises a voice model database configured to store a plurality of voice models, and wherein the voice model is one of the plurality of stored voice models.

16. The apparatus according to claim 13, wherein said voice biometrics system is configured to determine, at predefined intervals during said provision of the audio signal by the directional sound capturing system, that sound within the received at least one microphone output signal matches the voice model.

17. The apparatus according to claim 16, wherein said predefined intervals are predetermined amounts of time.

18. The apparatus according to claim 16, wherein said predefined intervals are predetermined numbers of words.

19. The apparatus according to claim 13, wherein said voice model includes a voice sample.

20. The apparatus according to claim 13, wherein said voice model is a voice model for a speaker.

21. The apparatus according to claim 13, wherein said determination by the voice biometrics system comprises a determination that sound within the received at least one microphone output signal matches at least one among a plurality of voice models.

22. The apparatus according to claim 13, wherein said voice biometrics system is configured to determine, subsequent to said determination of a match, that sound within at least one of the plurality of microphone output signals does not match any of the plurality of stored voice models, and
wherein said voice biometrics system is further configured to generate and store, in response to said determination of a non-match, a voice model that is based on sound within the at least one of the plurality of microphone output signals.

23. The apparatus according to claim 13, wherein said voice biometrics system is configured to characterize said sound within the received at least one microphone output signal and to compare the characterized sound to the voice model, and
wherein said determination by the voice biometrics system is based on a result of said comparison.

24. The apparatus according to claim 14, wherein said directional sound capturing system is configured to direct a beam, during said provision of the audio signal, in the first direction relative to the plurality of microphones, and wherein said voice biometrics system is configured to compare, subsequent to said determination and during said beam direction, sound within the received at least one microphone output signal with the voice model.

25. The apparatus according to claim 13, wherein said directional sound capturing system is configured to separate ambient noise within the plurality of microphone output signals from speech within the plurality of microphone output signals to produce the audio signal.

26. The apparatus according to claim 14, wherein said apparatus comprises the plurality of microphones, and wherein said plurality of microphones comprises:
a first microphone coupled to said voice biometrics system and to said directional sound capturing system, arranged to receive primarily sound from the first direction relative to the plurality of microphones, and configured to produce a first microphone output signal among the plurality of microphone output signals; and
a second microphone coupled at least to said directional sound capturing system, arranged to receive primarily sound from the second direction relative to the plurality of microphones, and configured to produce a second microphone output signal among the plurality of microphone output signals.

27. The apparatus according to claim 13, wherein said directional sound capturing system is configured to select a spatial separation filter from among a plurality of spatial separation filters and to apply the selected spatial separation filter to at least two of the plurality of microphone output signals to produce the audio signal.

28. The apparatus according to claim 14, wherein said directional sound capturing system is configured to provide, during said provision of the audio signal, a second audio signal in which sound from the first direction relative to the plurality of microphones is de-emphasized relative to sound from the second direction relative to the plurality of microphones.

29. The apparatus according to claim 28, wherein said apparatus comprises a noise reference refiner configured to remove residual desired sound from the second audio signal to generate a refined noise reference signal, and wherein said apparatus is further configured to subtract the refined noise reference signal from the audio signal.

30. The apparatus according to claim 13, wherein each of said plurality of microphone output signals is a digital signal.

31. The apparatus according to claim 13, wherein said voice biometrics system is configured to obtain, from one among the plurality of microphone output signals, a voice sample, and wherein said voice biometrics system is configured to determine that sound within the received at least one microphone output signal matches the voice model by determining that the voice sample matches the voice model.

32. The apparatus according to claim 31, wherein said voice biometrics system is arranged to receive at least two of the plurality of microphone output signals, and wherein said voice biometrics system is arranged to receive each one of the at least two microphone output signals separately from each other one of the at least two microphone output signals.

33. The apparatus according to claim 31, wherein said directional sound capturing system is configured to direct a beam, during said provision of the audio signal, in a first direction relative to the plurality of microphones, and wherein said voice biometrics system is configured to obtain, subsequent to said determination and during said beam direction, a second voice sample from said one among the plurality of microphone output signals and to determine whether the second voice sample matches the voice model.

34. The apparatus according to claim 13, wherein said voice biometrics system is arranged to receive at least two of the plurality of microphone output signals, and wherein said voice biometrics system is arranged to receive each one of the at least two microphone output signals separately from each other one of the at least two microphone output signals.

* * * * *